(12) United States Patent
Peng

(10) Patent No.: US 12,499,891 B2
(45) Date of Patent: Dec. 16, 2025

(54) AUDIO TRANSMISSION DEVICE, VOICE INTERACTION SYSTEM, INTELLIGENT INTERACTION INTEGRATION PLATFORM AND METHOD

(71) Applicant: WIZ HOLDINGS PTE. LTD., Singapore (SG)

(72) Inventor: Yinlu Peng, Singapore (SG)

(73) Assignee: WIZ HOLDINGS PTE.LTD., Singapore (SG)

( * ) Notice: Subject to any disclaimer, the term of this patent is extended or adjusted under 35 U.S.C. 154(b) by 385 days.

(21) Appl. No.: 18/330,362

(22) Filed: Jun. 6, 2023

(65) Prior Publication Data
US 2024/0412727 A1    Dec. 12, 2024

(51) Int. Cl.
*G10L 15/22*    (2006.01)
*G10L 13/02*    (2013.01)

(52) U.S. Cl.
CPC ............. *G10L 15/22* (2013.01); *G10L 13/02* (2013.01)

(58) Field of Classification Search
CPC .............................. G10L 15/22; G10L 13/02
See application file for complete search history.

(56) References Cited

U.S. PATENT DOCUMENTS

| | | | |
|---|---|---|---|
| 2018/0286387 A1* | 10/2018 | Bender | G06F 16/3329 |
| 2020/0167631 A1* | 5/2020 | Rezgui | B25J 9/0084 |
| 2020/0218767 A1* | 7/2020 | Ritchey | G09G 5/026 |
| 2022/0028378 A1* | 1/2022 | Jones | G06F 16/9532 |

* cited by examiner

*Primary Examiner* — Mohammad K Islam
(74) *Attorney, Agent, or Firm* — Syncoda LLC; Feng Ma

(57) ABSTRACT

An audio transmission device, through a virtual sound card, receives a first audio sent by a voice interaction system, and forwards, through an audio loopback device, the first audio to a voice platform; receives a second audio sent by the voice platform, and forwards the second audio to the voice interaction system through the audio loopback device. A third-party Voicebot Agent platform obtained by an enterprise can therefore be integrated into a cloud call center platform.

19 Claims, 6 Drawing Sheets

S1 a virtual sound card and an audio loopback module are loaded, and a virtual sound card A and a virtual sound card B are configured as full-duplex sound input and output apparatus according to an implementation scenario S2 a web page of a human agent workbench is taken as an example, operation steps that a real human customer service use a web end of the cloud call center platform are analyzed and recorded, and the operation steps are configured as a data structure that a browser process automation module can understand S3 a browser process automation running instance is initialized, and a sound output apparatus is configured as a virtual sound card A and a sound input apparatus is configured as a virtual sound card B for this running instance S4 after the browser process automation running instance is successfully initialized, the operation steps of the human customer service configured in step 1 on the cloud call center platform are analyzed, and a real human customer service that logs in the platform and enters a workbench page of a human agent is simulated S5 when an incoming call is assigned to the currently logged-in human customer service account, this incoming call event is captured by the browser process automation running instance through monitoring a property change of the page element.

S6 when an incoming call event is captured, the call is answered by the running instance by clicking on the page element according to a configuration in step 1; the Voicebot Agent client module is notified through an interface invoking or other means to wake up one Voicebot Agent instance for performing a voice interaction S7 a voice interaction with the Voicebot Agent system is performed by the Voicebot Agent client module; when the module is initialized, a virtual sound card B is configured as a sound output apparatus, and a virtual sound card A is configured as a sound input apparatus S8 a voice of a user dialing the incoming call is obtained by the Voicebot Agent client module, and then sends it to the Voicebot Agent platform for identification and processing S9 the Voicebot Agent platform which is implemented through an independent algorithm performs a series of processing such as ASR, NLP, and TTS audio synthesis on a received audio, and returns an answering audio of the Voicebot Agent answer S10 a sound of the answering audio is outputted by the Voicebot Agent client module, after receiving the answering audio, to the virtual sound card B; because the virtual sound card B is the sound input apparatus of the browser process automation running instance, thus the browser process automation running instance can obtain an audio stream of the answering audio in real time and play it to a user who dialed in the incoming call

FIG. 2

AUDIO TRANSMISSION DEVICE, VOICE INTERACTION SYSTEM, INTELLIGENT INTERACTION INTEGRATION PLATFORM AND METHOD

BACKGROUND

Compared with a traditional call center that requires a fixed-line telephone to access a system of call center platform, a current mainstream call center platform allows a customer service personnel of an enterprise to access the system anytime and anywhere through a web page or a software-based calling system (e.g., softphone), so as to communicate with customers and provide customers with more convenient service.

SUMMARY

The present disclosure relates generally to a technical field of a voice data processing, and more specifically to an audio transmission device, a voice interaction system, an intelligent interaction integration platform and method.

Embodiments of the present disclosure provide an audio transmission device, a voice interaction system, an intelligent interaction integration platform and method, to at least solve the problem that a traditional cloud call center in the related technologies cannot meet a customer service experience requirement of an enterprise, or cannot integrate a third-party Voicebot Agent platform purchased by an enterprise into a cloud call center platform.

In one aspect of the present disclosure, an audio transmission device is proposed, including a virtual sound card module and an audio loopback module. A sound card is a device to translate digital audio signals to analog audio signals and from analog audio signals to digital audio signals. Integrated into a computer, a sound card is a component to output sounds through speakers or headphones and to input audio signals from microphones into the computer. A virtual sound card is a computer software application to emulate a sound card device to record or broadcast sounds. The virtual sound card module in this present disclosure is configured to: receive a first audio sent by a voice interaction system, and forward the first audio to the intelligent voice platform through the audio loopback module; and/or receive a second audio sent by the intelligent voice platform, and forward the second audio to the voice interaction system through the audio loopback module.

In some embodiments, the virtual sound card module includes at least two virtual sound card units, where the virtual sound card unit is in simplex mode or full duplex mode.

In some embodiments, a virtual sound card module includes: a first sound card unit, configured to receive the first audio sent by the voice interaction system, and forward the first audio to the intelligent voice platform through the audio loopback module; a second sound card unit, configured to receive the second audio sent by the intelligent voice platform, and forward the second audio to the voice interaction system through the audio loopback module.

In some embodiments, the first audio includes at least one voice data stream, and the second audio includes at least one voice data stream, where the first audio is a response to the second audio, or the second audio is a response to the first audio.

In another aspect of the present disclosure, a voice interaction system is also provided, including the above-mentioned audio transmission device, and the voice interaction system also includes a voice interaction server and a voice interaction operation terminal, where the voice interaction server is configured to: receive a third audio sent by a user, and send the third audio to the voice interaction operation terminal. The voice interaction operation terminal is configured to: send the third audio to the audio transmission device; and/or receive a fourth audio sent by the audio transmission device, and send the fourth audio to the voice interaction server. The voice interaction server is further configured to: send the fourth audio to a user.

In some embodiments, the voice interaction server is further configured to: startup the voice interaction operation terminal based on a process operation automation technology, and bind an input apparatus and an output apparatus of the voice interaction operation terminal onto two idle virtual sound card units in the virtual sound card module; after the voice interaction operation terminal is initialized, according to a process automation step defined by a template, simulate a real human customer service personnel to log in the voice interaction operation terminal, and use a communication function of the voice interaction system.

In another aspect of the present disclosure, an intelligent voice platform is also provided, including the above-mentioned audio transmission device. The intelligent voice platform also includes a Voice robot server and a voice robot client, where the voice robot client is configured to: receive a fifth audio sent by the audio transmission module, and send the fifth audio to the Voice robot server; and/or receive a sixth audio sent by the Voice robot server, and send the sixth audios to the audio transmission device.

In another aspect of the present disclosure, an intelligent interaction integration platform is also provided, including the above-mentioned audio transmission device, the intelligent interaction integration platform also includes: a voice interaction system and an intelligent voice platform, where the voice interaction system includes a voice interaction server and a voice interaction operation terminal, the intelligent voice platform includes a voice robot server and a voice robot client. Where the voice interaction server is configured to: receive a first audio sent by a user terminal, and forward the first audio to the voice interaction operation terminal; the voice interaction operation terminal is configured to: send a received first audio to the audio transmission module; the audio transmission module is configured to: send the first audio to the voice robot client; the voice robot client is configured to: send the first audio to the voice robot server, and receive a second audio sent by the voice robot server, and then send the second audio to the audio transmission module; the audio transmission module is also configured to: send the second audio to the voice interaction operation terminal; the voice interaction operation terminal is also configured to: send a received second audio to the voice interaction server; the voice interaction server is also configured to: send the second audio to the user terminal.

In another aspect of the present disclosure, a method for intelligent interaction integration is also provided, including: step 1, loading a virtual sound card module and an audio loopback module, wherein the virtual sound card module includes at least two virtual sound card units; step 2, reproducing, through an automation module of a voice interaction system, operations that a real person logs into a voice interaction operation terminal and performs a voice interaction service, initializing one first running instance for automating the voice interaction service on the voice interaction operation terminal, and configuring a sound output apparatus as a first virtual sound card unit and configuring a sound input unit as a second virtual sound card unit for the first running instance; step 3, running the first running instance and logging in a first account, wherein the first account monitors whether there is an incoming voice data to be processed, and when there is the incoming voice data which is assigned to the first account, the first running instance captures the incoming voice data as a first telephone event; step 4, clicking, by the first running instance according to the first telephone event, a page element to answer the first telephone event, and waking up a first voice robot instance on a voice robot client, wherein a sound input apparatus of the voice robot client is the first virtual sound card unit, a sound output apparatus of the voice robot is the second virtual sound card unit; step 5, after the first telephone event is connected, outputting, by the first running instance, a first audio of a user dialing in the first telephone event to the first virtual sound card unit, and then inputting the first audio to the voice robot client, so that the first audio is identified and processed by the voice robot server; step 6, returning, by the voice robot server, a corresponding second audio for the first audio, and outputting, by the voice robot client, the second audio to the first running instance through the second virtual sound card unit; and step 7, sending, by the first running instance, the second audio to the user dialing in the first telephone event.

In a fourth aspect of the present disclosure, a non-transitory computer-readable storage medium is also provided. The non-transitory computer-readable storage medium, comprising computer program instructions which, when executed by a processor, cause the processor to implement the method according to any one of the above methods.

In a fifth aspect of the present disclosure, an electronic device is provided, including a memory and a processor, wherein computer program instructions are stored in the memory, and the computer program instructions, when executed by a processor, cause the processor to implement the method according to any one of the above method embodiments.

In another aspect, a computer system is provided, including an audio transmission device and one or more processing circuits,
wherein the audio transmission device includes a virtual sound card and an audio loopback device, and wherein the virtual sound card is configured to:
receive a first audio sent by a voice interaction system;
forward the first audio to a voice platform through the audio loopback device;
receive a second audio sent by the voice platform; and
forward the second audio to the voice interaction system through the audio loopback device;
wherein the one or more processing circuits are configured to:
load the virtual sound card and the audio loopback device, wherein the virtual sound card comprises at least two virtual sound card devices;
emulate, through an automation device of a voice interaction system, operations of an operator logging into a voice interaction operation terminal and performing a voice interaction service, initializing one first running instance for automating the voice interaction service on the voice interaction operation terminal, and configuring a sound output apparatus as a first virtual sound card device and configuring a sound input unit as a second virtual sound card device for the first running instance;
run the first running instance and log in a first account, wherein the first account monitors whether there is an incoming voice data to be processed, and when there is the incoming voice data which is assigned to the first account, the first running instance captures the incoming voice data as a first telephone event;
click, with the first running instance according to the first telephone event, a page element to answer the first telephone event, and wake up a first voice robot instance on a voice robot client, wherein a sound input apparatus of the voice robot client is the first virtual sound card unit, a sound output apparatus of the voice robot is the second virtual sound card unit;
after the first telephone event is connected, output, with the first running instance, the first audio of a user dialing in the first telephone event to the first virtual sound card unit, and then input the first audio to the voice robot client, so that the first audio is identified and processed by the voice robot server;
return, with the voice robot server, a corresponding second audio for the first audio, and output, with the voice robot client, the second audio to the first running instance through the second virtual sound card unit; and
send, with the first running instance, the second audio to the user dialing in the first telephone event.

In some embodiments, the first audio includes at least one voice data stream, and the second audio comprises at least one voice data stream, and wherein the first audio is a response to the second audio, or the second audio is a response to the first audio.

In some embodiments, the voice interaction system further includes:
a voice interaction server; and
a voice interaction operation terminal,
wherein
the voice interaction server is configured to:
receive a third audio sent by a user, and send the third audio to the voice interaction operation terminal;
the voice interaction operation terminal is configured to:
send the third audio to the audio transmission device; receive a fourth audio sent by the audio transmission device; and send the fourth audio to the voice interaction server; and
the voice interaction server is further configured to:
send the fourth audio to the user.

In some embodiments, the voice interaction server is further configured to:
start up the voice interaction operation terminal based on a process operation automation technology, and bind an input apparatus and an output apparatus of the voice interaction operation terminal onto two idle virtual sound card devices in the virtual sound card, respectively; and
after the voice interaction operation terminal is initialized, simulate, according to a process automation step defined by a template, a real human customer service personnel to log in the voice interaction operation terminal, and use a communication function of the voice interaction system.

In some embodiments, the computer system further includes an interaction integration platform including the audio transmission device, wherein the interaction integration platform further comprises a voice interaction system and a voice platform, and wherein the voice interaction system comprises a voice interaction server and a voice interaction operation terminal, and the voice platform comprises a voice robot server 108 and a voice robot client, wherein the voice interaction server is configured to receive a first audio sent by a user terminal, and forward the first audio to the voice interaction operation terminal;

the voice interaction operation terminal is configured to send a received first audio to the audio transmission device;

the audio transmission device is configured to send the first audio to the voice robot client;

the voice robot client is configured to send the first audio to the voice robot server, and receive a second audio sent by the voice robot server, and then send the second audio to the audio transmission device;

the audio transmission device is further configured to: send the second audio to the voice interaction operation terminal;

the voice interaction operation terminal is further configured to send a received second audio to the voice interaction server; and the voice interaction server is further configured to send the second audio to the user terminal.

In some embodiments, the voice interaction operation terminal comprises a microphone configured to capture sound and convert the captured sound to audio signals.

In some embodiments, computer system further includes a display screen configured to display the page element.

Various embodiments of the present disclosure provide an audio transmission device. The audio transmission device, through a virtual sound card module, receives a first audio sent by a voice interaction system, and forwards, through an audio loopback module, the first audio to the intelligent voice platform; and/or receives a second audio sent by an intelligent voice platform, and forwards the second audio to the voice interaction system through the audio loopback module.

Some embodiments of the present disclosure can solve the problem that a traditional cloud call center cannot meet a customer service experience requirement of an enterprise, or cannot integrate a third-party Voicebot Agent platform purchased by an enterprise into a cloud call center platform. An approach provided by the embodiments of the present disclosure to solve the problems is to load two core software modules of a virtual sound card and an audio loopback module on an operation terminal of a voice interaction system such as a cloud call center, and to simulate a ability of a real human customer service that performs a voice interaction with this terminal through the terminal's microphone and earphone, so as to realize an ability of forwarding the voice input and output to a Voice robot system and realize a real-time integration of a voice interaction.

BRIEF DESCRIPTION OF THE DRAWINGS

The drawings described here are used to provide a further understanding of the present disclosure and constitute a part of the present disclosure. Schematic embodiments and descriptions thereof are used to explain the present disclosure and do not constitute an improper limitation to the present disclosure. In the drawings:

FIG. 2 is a flowchart of an optional intelligent interaction integration method according to some embodiments of the present disclosure.

DETAILED DESCRIPTION

Figure 1:
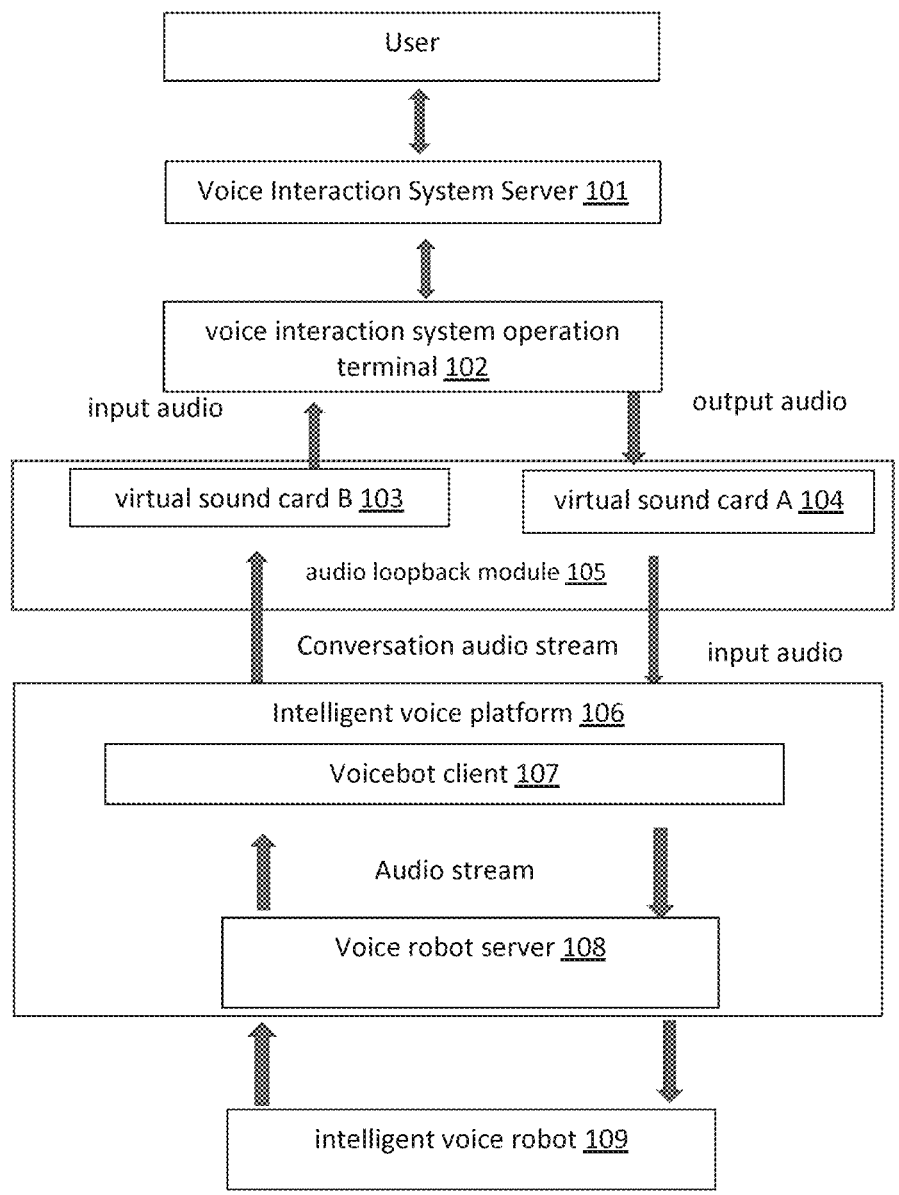
FIG. 1 is a structural diagram of a first optional intelligent interaction integration platform according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments and not intended to limit the present disclosure. "A/an," "said" and "the" in a singular form in the present disclosure and the appended claims are also intended to include a plural form, unless other meanings are clearly denoted throughout the present disclosure. It is also to be understood that term "and/or" used herein refers to and includes any or all possible combinations of one or more associated items that are listed.

It is to be understood that, although terms first, second, third, etc., may be adopted to describe various information in the present disclosure, the information should not be limited by these terms. These terms are only adopted to distinguish the information of the same type. For example, without departing from the scope of the present disclosure, first information may also be called second information and, similarly, second information may also be called first information. For example, term "if" used herein may be explained as "while" or "when" or "responsive to determining," which depends on the context.

A cloud call center platform can lower a threshold for enterprises to use call centers, and solve a problem of building low cost and cross-regional call centers for enterprises. A telephone customer service system of the cloud call center platform can assign incoming calls or outbound call tasks to an enterprise's human customer services that are currently online and idle. With the development of business, the enterprises may need to recruit more telephone customer service staff to handle more outbound call tasks and incoming call answering.

In order to solve problems of labor cost and training management for enterprises' human customer services, after an enterprise builds or purchases a service of a call center, a service of voice robot agent (Voicebot Agent) can be obtained (e.g., purchased from a vendor or a software developer) and integrated into the call center, and the Voicebot Agent is used to handle a business of a telephone customer service.

In some embodiments, a Voicebot is a software with artificial intelligence (AI) technology that allows a caller to navigate an interactive voice system with his or her voice in a natural conversational language and not have to listen to menus and press numbers on his or her keypads.

In some embodiments, a Voicebot can be designed to interact with users through spoken language. It can employ natural language processing (NLP) and speech recognition capabilities to understand and respond to user queries and commands. Voicebots can be implemented in various ways, utilizing different software and hardware configurations to provide a seamless and intuitive user experience.

Several embodiments and implementations of Voicebots are described as follows.

Software-based Voicebot: This implementation relies on software running on a device such as a smartphone, computer, or smart speaker. The software utilizes a combination of speech recognition algorithms, NLP models, and predefined responses to interpret user input and generate appropriate responses. These Voicebots can be integrated into existing applications, messaging platforms, or voice assistants, allowing users to engage with them through voice commands.

Cloud-based Voicebot: In this embodiment, the Voicebot's software resides in the cloud, leveraging powerful servers and infrastructure for processing user interactions. The user's voice commands are transmitted over the internet to the cloud servers, where the speech recognition and NLP algorithms analyze and generate responses. Cloud-based Voicebots offer scalability and flexibility, as they can handle a large number of users simultaneously and continuously improve their performance through machine learning algorithms.

Embedded Voicebot: This hardware implementation involves integrating a Voicebot directly into a physical device, such as a robot, smart appliance, or automobile. These Voicebots are designed to function autonomously, utilizing onboard hardware resources, including microphones, processors, and memory. They can understand user commands, perform tasks, and provide feedback without relying on external devices or internet connectivity. Embedded Voicebots find applications in smart homes, industrial automation, and automotive voice assistants.

Wearable Voicebot: This implementation focuses on incorporating Voicebot technology into wearable devices like smartwatches, smart glasses, or headphones. These devices have built-in microphones and speakers to facilitate voice-based interactions. The Voicebot software may reside on the wearable device itself or offload processing to a companion smartphone or cloud server. Wearable Voicebots enable users to perform hands-free operations, such as making calls, checking notifications, or controlling other connected devices, by simply speaking commands.

Social Media Voicebot: With the increasing popularity of social media platforms, Voicebots can be implemented to interact with users through voice on these platforms. Users can engage with Voicebots by leaving voice messages or making voice calls. The Voicebot software processes the voice inputs, extracts relevant information, and generates appropriate responses, which can be transmitted back to the user as text or voice. Social Media Voicebots find applications in customer support, content creation, and personal assistants on platforms like Facebook, Twitter, and Instagram.

These embodiments and implementations of Voicebots highlight the diverse ways in which this technology can be applied to enhance user experiences, streamline workflows, and enable intuitive interactions through spoken language. The flexibility of Voicebot implementations allows for customization to various domains and contexts, catering to the specific needs and preferences of users in different scenarios.

A Session Initialization Protocol (SIP) can be used by a call center platform to interface with a Voicebot Agent system, which may require both parties to be able to support an SIP.

An SIP can be used for initiating, modifying, and terminating communication sessions between participants over IP networks. SIP is designed to establish and manage sessions involving various media types, including voice, video, instant messaging, and interactive games. It enables users to communicate in real-time and facilitates features such as call routing, presence, and mobility.

The following are some examples of SIP.

Call Setup: One of the primary functions of SIP is to establish and tear down communication sessions. When a user initiates a call, SIP handles the signaling process by exchanging messages between the caller and the callee. These messages include session invitations, acknowledgments, and call termination notifications. SIP enables the negotiation of session parameters, such as codecs, media types, and session descriptions, ensuring compatibility and seamless communication between participants.

Presence and Instant Messaging: SIP incorporates presence and instant messaging capabilities, allowing users to indicate their availability and exchange messages in real-time. Presence information indicates whether a user is available, busy, or offline, facilitating efficient communication and avoiding unnecessary call attempts. SIP-based instant messaging enables text-based conversations, file sharing, and multimedia exchanges between users, enhancing collaboration and communication across various platforms and devices.

Mobility and Roaming: SIP supports mobility and roaming scenarios by allowing users to seamlessly move between different network domains or devices without interrupting ongoing communication sessions. For example, a user can start a call on their smartphone and continue it on their desktop computer or transfer a call to another device while on the move. SIP facilitates session handover and re-establishes connections to ensure uninterrupted communication as users switch between networks or devices.

WebRTC Integration: SIP is often integrated with WebRTC (Web Real-Time Communication) to enable browser-based communication. WebRTC allows browsers to establish peer-to-peer audio, video, and data connections without the need for plugins or additional software. By combining SIP and WebRTC, web applications can initiate SIP sessions directly from the browser, enabling seamless communication without requiring separate communication clients or applications.

Unified Communications: SIP forms the basis for many unified communications solutions, which integrate various communication channels and services into a single platform. These platforms enable users to access voice, video, messaging, and collaboration tools through a unified interface. SIP facilitates the interoperability of different communication systems, devices, and protocols, allowing users to communicate seamlessly across diverse networks and services.

Overall, SIP can play a role in enabling real-time communication and collaboration over IP networks. Its flexibility, extensibility, and support for multiple media types make it a widely adopted protocol for voice and multimedia communication. The various implementations and embodiments of SIP cater to different use cases, ranging from traditional voice calling to advanced unified communication platforms, ultimately enhancing connectivity and facilitating efficient communication across diverse networks and devices.

Although a cloud call center can have a built-in Voicebot Agent function or supports a part of Voicebot Agent platforms through a way of a cooperative development, there are also problems that the built-in Voicebot Agent function may be overly simple and cannot meet a customer service experience requirement of an enterprise, or cannot integrate a purchased third-party Voicebot Agent platform of an enterprise into a cloud call center platform.

A cloud call center may not meet a customer service experience requirement of an enterprise, or cannot integrate a third-party Voicebot Agent platform purchased by the enterprise into a cloud call center platform.

Various embodiments of the present disclosure provide an integration of a Voicebot Agent and a call center platform.

A call center platform integrated with Voicebot can combine human customer service agents with automated voice technologies to enhance customer support experiences. This integration enables the automation of routine tasks and provides self-service options while still allowing customers to interact with human agents when necessary.

Here are several hardware and software implementations and embodiments of a call center platform integrated with Voicebot:

Hardware Implementation: In this embodiment, the call center platform utilizes dedicated hardware resources to support the Voicebot integration. This may involve deploying hardware-based voice processing servers, telephony gateways, and interactive voice response (IVR) systems. These components work in conjunction with the Voicebot software to handle incoming calls, route them to the appropriate resources, and provide self-service options through automated voice prompts. Hardware implementations can offer high reliability, scalability, and dedicated processing power for efficient call handling.

Software Implementation: A software-based implementation integrates the Voicebot functionality into the existing call center infrastructure. The call center platform software incorporates the Voicebot capabilities, leveraging speech recognition, natural language processing, and predefined responses to interact with callers. This approach allows for flexibility and easy integration with other call center tools, such as customer relationship management (CRM) systems and agent desktop applications.

Cloud-Based Implementation: A cloud-based call center platform integrated with Voicebot leverages cloud infrastructure and services to deliver scalable and flexible voice automation capabilities. The Voicebot software resides in the cloud, allowing for efficient call routing and handling across multiple locations. Cloud-based implementations offer advantages such as on-demand scalability, reduced hardware requirements, and easier software updates and maintenance. They also provide the ability to leverage advanced machine learning algorithms for continuous improvement of the Voicebot's performance.

IVR Integration: Interactive voice response (IVR) systems are commonly used in call centers to automate call handling processes. Integrating Voicebot technology into the IVR system enables more sophisticated and conversational interactions with callers. Voicebots can understand spoken commands, retrieve information from databases, and perform basic tasks without requiring human intervention. This integration allows callers to navigate through menus, obtain account information, or initiate certain actions, such as making a payment or checking order status, using voice commands.

Agent-Assist Tools: Another embodiment involves integrating Voicebot capabilities into agent-assist tools used by customer service representatives. The Voicebot software can provide real-time suggestions, information retrieval, and response generation based on the conversation between the agent and the caller. This integration assists agents in quickly accessing relevant information, automating repetitive tasks, and improving response accuracy. By reducing the burden on agents, they can focus on complex customer inquiries and provide personalized assistance when required.

These various embodiments and implementations of a call center platform integrated with Voicebot showcase the versatility and benefits of combining automated voice technologies with human customer service support. By leveraging hardware and software solutions, cloud infrastructure, IVR systems, and agent-assist tools, organizations can enhance customer interactions, improve efficiency, and provide a seamless and personalized experience throughout the call center journey.

An application scenario of the integration of a voice robot (Voicebot) and a voice interaction system can be used as an example to illustrate some embodiments of the present disclosure.

There will be a large number of logically complex data interactions between a Voicebot Agent system and a call center platform. As such, it may take a lot of time cost for system integration.

In some examples, the following approaches to integrate the Voicebot Agent system into a call center platform may be adopted.

For the call center platform with centralized networking, a telephone soft switch module may be developed by the Voicebot Agent system itself to support the SIP protocol to realize a function of telephone calls.

The telephone soft switch module can be configured to register the Voicebot Agent as an SIP client to a call center platform, and configure the Voicebot Agent as an intelligent agent in an agent management module of the call center platform, so as to handle specific outbound call tasks and incoming call services. In a process of dialing and talking, the telephone soft switch module uses the SIP protocol to initiate or answer calls admitted by a call center, and realizes a pure software telephone voice communication through a SIP/RTP (Real-time Transport Protocol).

In some embodiments, a telephone soft switch module integrated with a Voicebot combines the functionality of a soft switch, a software-based telephony switch, with the capabilities of a Voicebot to enable advanced call routing, automation, and voice-based interactions.

The following are several examples of software and hardware implementations of a telephone soft switch module functioning with a Voicebot.

Software-based Implementation: In this embodiment, the telephone soft switch module is implemented as a software application running on a server or virtual machine. It utilizes Voice over IP (VOIP) protocols to handle call signaling, routing, and media processing. The integration with a Voicebot involves incorporating Voicebot capabilities, such as speech recognition and natural language processing, into the soft switch module. This allows the Voicebot to interact with callers, understand their queries, and provide automated responses or route calls to human agents when necessary.

Cloud-based Implementation: A cloud-based telephone soft switch module integrated with a Voicebot leverages cloud infrastructure and services to handle call routing and automation. The soft switch module runs in the cloud, utilizing the scalability and flexibility of cloud resources. The Voicebot component can be deployed alongside the soft switch, enabling automated voice-based interactions with callers. Cloud-based implementations offer advantages such as easy scalability, high availability, and the ability to leverage advanced machine learning algorithms for continuous improvement of the Voicebot's performance.

Hardware-based Implementation: In some cases, a telephone soft switch module integrated with a Voicebot can be implemented as a dedicated hardware appliance. This hardware-based solution combines the functionalities of a soft switch and Voicebot into a single device. The hardware appliance handles call routing, signaling, and media processing, while also incorporating Voicebot capabilities for automated voice interactions. Hardware-based implementations can offer high reliability, performance, and dedicated processing power for efficient call handling and Voicebot operations.

Integrated Telephony Platform: In this implementation, the telephone soft switch module integrated with a Voicebot is part of a comprehensive telephony platform. The platform includes all the necessary hardware and software components for call handling, routing, and automation. The soft switch module forms the core of the platform, while the Voicebot component adds automated voice-based interaction capabilities. This integrated approach enables seamless call routing, advanced automation, and personalized voice interactions throughout the telephony platform.

Unified Communication System: Another example is the integration of the telephone soft switch module with a Voicebot into a unified communication system. This system combines voice, video, messaging, and collaboration tools into a single platform. The soft switch module manages call routing and automation, while the Voicebot component enhances the user experience through voice-based interactions. This integration allows users to access advanced communication features, automation options, and Voicebot services within the unified communication environment.

These examples demonstrate the diverse ways in which a telephone soft switch module can be integrated with a Voicebot, providing advanced call handling, automation, and voice-based interactions. Whether implemented as software applications, cloud-based solutions, hardware appliances, or part of integrated platforms or communication systems, the integration of soft switch modules with Voicebots enhances telephony capabilities and customer experiences in various communication environments.

For a cloud call center platform, if the cloud call center platform supports a way of SIP protocol interfacing, a traditional call center platform with centralized networking may be referred to being based on a solution with the Voicebot Agent system integrated.

However, there can be differences between the cloud call center platform integrating a Voicebot Agent and a call center platform (with centralized networking) integrating a Voicebot Agent. For example, because a data flow will go through an internet in a process of making a phone call and during the phone call by the cloud call center platforms, there may be a need for the Voicebot Agent system to provide a public network IP address to ensure that the cloud call center can communicate with a telephone soft switch module of the Voicebot Agent system.

In addition, a communication between two parties, the cloud call center and the telephone soft switch module of the Voicebot Agent system, generally use a virtual private network (VPN) to ensure a security of communication data.

In addition to the SIP protocol, some cloud call center platforms also support an integration with the Voicebot Agent system by a way of Voice API (Application Program Interface, abbreviated as API). In this mode, the Voicebot Agent system needs to complete a telephone call between the two parties and a data transmission during the telephone call according to an API document and an SDK (Software Development Kit) provided by the cloud call center platform. Such interfacing method provides an additional integration method for the Voicebot Agent system. However, because Voice APIs provided by different cloud call centers are quite different, the Voicebot Agent system needs to take a large labor cost to integrate its own voice agent into each cloud call center platform; moreover, it takes a long development cycle to complete the integration with a new cloud call center platform.

For a cloud call center platform that does not support the SIP protocol and the Voice API, the platform usually will be integrated with its own Voicebot Agent module internally, or choose some Voicebot Agent platforms as partners so that the cloud call center platform and the partners can, by a way of collaborative development, design and implement a private protocol and interface for realizing an integration between the cloud call center platform and the partners. In addition, there is often no way to implement an integration with a third-party Voicebot Agent.

Some embodiments of the present disclosure can solve a problem that when products such as a Voice robot need to be integrated with a cloud call center system or other voice interaction system, so as to achieve a voice service capability similar to a real human customer service, the products all need to be integrated and interfaced through various audio-related interactive protocols such as SIP, RTP, MRCP, etc. As such, the achievement of the integration and interfacing is limited by support capabilities of various systems involved in the integration to the protocols. If a third-party system cannot support such protocol well, it will lead to that a Voice robot product will not be able to function.

An approach provided by some embodiments of the present disclosure to solve the problems is to load two core software modules of a virtual sound card module and an Audio forward module on an operation terminal of a voice interaction system such as a cloud call center, and to simulate an ability of a real human customer service that performs a voice interaction with this terminal through the terminal's microphone and earphone, so as to realize an ability of forwarding a voice input and output to a Voice robot system, therefore realizing a real-time integration of a voice interaction. In addition, the browser or other applications on the control terminal, combined with an automation control module such as Robotic process automation (RPA) on an operation terminal (including but not limited to RPA modules based on a browser interface or a desktop control, or a certain software module that can automatically control the above-mentioned voice interaction system interface), can complete various operations that simulate a real human customer service, therefore the Voice robot can complete a complete voice interaction with users like a real human customer service or a part of the voice interaction. The method does not depend on any audio-related protocol and communication technology integration framework, and can be implemented on any call center system or other voice interaction system that supports a voice interaction of a real human customer service.

FIG. 1 is a structural diagram of an intelligent interaction integration platform according to some embodiments of the present disclosure.

In some embodiments of the present disclosure, an audio transmission device is proposed, including a virtual sound card module and an audio forwarding module, wherein the virtual sound card module is configured to: receive a first audio sent by a voice interaction system, and forward the first audio to an intelligent voice platform 106 through the audio loopback device (e.g., module) 105; and/or receive a second audio sent by the intelligent voice platform 106, and forward the second audio to the voice interaction system through the audio loopback module 105.

In some embodiments, an audio transmission device is proposed, including a virtual sound card module wherein the virtual sound card allows a device to generate and process audio signals, and comprises at least two virtual sound card devices, and wherein the at least two virtual sound card devices are in a simplex mode or a full duplex mode.

In some embodiments, an audio loopback device in a call center platform allows for the testing, monitoring, and quality assurance of audio streams within the system. It enables the routing of audio signals from one point to another, facilitating the verification of audio quality, echo cancellation, and audio processing algorithms.

The following are several examples of software and hardware implementations of an audio loopback device in a call center platform.

Software-based Loopback Device: In this implementation, the audio loopback device is created using software. It can be a virtual sound card or a virtual audio driver installed on the call center platform's server or computer. The software loopback device receives audio input from one source, such as a microphone, and routes it back as audio output to another destination, such as speakers or headphones. This software-based solution allows for flexible configuration and easy integration into the call center platform's audio processing pipeline.

Hardware-based Loopback Device: A hardware-based audio loopback device can be a physical device designed specifically for routing audio signals within the call center platform. It can comprise audio inputs and outputs, such as microphone and speaker ports, connected via internal circuitry. The device captures audio from an input source and feeds it back as output. Hardware loopback devices can be used for audio testing and quality assurance, providing accurate monitoring and analysis of audio streams.

Call Recording Integration: An audio loopback device can be integrated into the call recording system of a call center platform. The loopback device captures the audio streams from the communication channels, such as voice calls or conference calls, and routes them back into the recording system. This integration allows for real-time monitoring and quality assessment of the recorded audio, ensuring high-quality and reliable recordings for training, compliance, or analysis purposes.

Voice Analytics and Speech Recognition: In some call center platforms, an audio loopback device can be implemented to facilitate voice analytics and speech recognition. The device captures audio from the communication channels, processes it using speech recognition algorithms or voice analytics software, and provides real-time feedback or analysis. This enables the call center platform to extract valuable insights from the audio streams, such as sentiment analysis, keyword detection, or call transcription.

Diagnostic and Troubleshooting Tools: An audio loopback device can serve as a diagnostic and troubleshooting tool in the call center platform. It allows administrators or technicians to test audio paths, identify potential issues, and assess audio quality in real-time. By capturing audio from specific sources and routing it back to designated destinations, the loopback device helps in diagnosing problems related to echo, latency, noise, or audio distortion within the call center platform.

These various software and hardware implementations of an audio loopback device in a call center platform provide capabilities for testing, monitoring, and ensuring high-quality audio streams. Whether implemented as software-based solutions and/or hardware devices, integrated with call recording systems, or used for voice analytics and troubleshooting, audio loopback devices can play help maintaining reliable and efficient communication within the call center environment.

It should be noted that an audio forwarding method based on a virtual sound card provided in the embodiments of the present disclosure refers to forwarding an input audio stream and an output audio stream between multiple virtual sound card apparatuses in real time through the audio loopback module 105, so as to realize an audio transmission between two programs.

A virtual sound card used in some embodiments of the present disclosure may be a commercial software of which a license may need to be purchased, or may be an open-source audio framework.

According to different integration application scenarios of various embodiments of the present disclosure, a virtual sound card in simplex mode may be used, that is, a single virtual sound card apparatus may only be used as an input apparatus of audio or an output apparatus of audio, and may only be linked with one sound program at the same time. A virtual sound card in full-duplex mode may also be used, thus multiple sound programs are supported to be inputted into one virtual sound card apparatus at the same time, and multiple programs are also supported to obtain sound from this virtual sound card apparatus at the same time.

The audio loopback module 105 can be configured to be capable of completing a configuration of a virtual sound card for audio forwarding according to an integration scenario, and allocating an available virtual sound card apparatus for programs that require audio interaction.

In some embodiments, a virtual sound card module includes: a first sound card unit, configured to receive the first audio sent by the voice interaction system, and forward the first audio to the intelligent voice platform 106 through the audio loopback module 105; a second sound card unit, configured to receive the second audio sent by the intelligent voice platform 106, and forward the second audio to the voice interaction system through the audio loopback module 105.

In some embodiments, the first audio includes at least one voice data stream, and the second audio includes at least one voice data stream, wherein the first audio is a response to the second audio, or the second audio is a response to the first audio.

In some other embodiment of the present disclosure, a voice interaction system is also provided, where the voice interaction system enables users to interact with a device using spoken hands-free commands, and includes the above-mentioned audio transmission device. The voice interaction system also includes a voice interaction server (that is, the voice interaction system server 101 1002 in FIG. 1) and a voice interaction operation terminal (that is, the voice interaction system operation terminal 102 in FIG. 1), where the voice interaction server is configured to: receive a third audio sent by a user, and send the third audio to the voice interaction operation terminal. The voice interaction operation terminal is configured to: send the third audio to the audio transmission device; and/or receive a fourth audio sent by the audio transmission device, and send the fourth audio to the voice interaction server. The voice interaction server is further configured to: send the fourth audio to a user.

In some embodiments, the voice interaction server is further configured to: startup the voice interaction operation terminal based on a process operation automation technology, and bind an input apparatus and an output apparatus of the voice interaction operation terminal onto two idle virtual sound card units in the virtual sound card module; after the voice interaction operation terminal is initialized, simulate, according to a process automation step defined by a template, a real human customer service personnel to log in the voice interaction operation terminal, and use a communication function of the voice interaction system.

In some other embodiments of the present disclosure, an intelligent voice platform 106 is also provided, including the above-mentioned audio transmission device. The intelligent voice platform 106 also includes a voice robot server 108 and a voice robot client, where the voice robot client is configured to: receive a fifth audio sent by the audio transmission module, and send the fifth audio to the voice robot server 108; and/or receive a sixth audio sent by the voice robot server 108, and send the sixth audio to the audio transmission device.

In some other embodiments of the present disclosure, an intelligent interaction integration platform is also provided, including the above-mentioned audio transmission device, the intelligent interaction integration platform also includes: a voice interaction system and an intelligent voice platform 106, where the voice interaction system includes a voice interaction server and a voice interaction operation terminal, and wherein the intelligent voice platform 106 includes a voice robot server 108 (e.g., the intelligent voice platform 106 Voicebot server in FIG. 1) and a voice robot client (e.g., the Voicebot client 107 in FIG. 1). The voice interaction server is configured to: receive a first audio sent by a user terminal, and forward the first audio to the voice interaction operation terminal; the voice interaction operation terminal is configured to: send a received first audio to the audio transmission module; the audio transmission module is configured to: send the first audio to the voice robot client; the voice robot client is configured to: send the first audio to the voice robot server 108, and receive the second audio sent by the voice robot server 108, and then send the second audio to the audio transmission module; the audio transmission module is also configured to: send the second audio to the voice interaction operation terminal; the voice interaction operation terminal is also configured to: send a received second audio to the voice interaction server; and the voice interaction server is also configured to: send the second audio to the user terminal.

It should be noted that a terminal automation method of a voice interaction system refers to a process automation template for defining and executing operations according to a use process of an operation terminal of a voice interaction system.

The voice interaction system included in the embodiment of the present disclosure includes call center platform, Voice Chat Platform, Voice conference platform (Audio Conferencing Platform) and other software and platforms for message interaction through audio. A terminal application of the platform is not limited to a mode of a software application or a web application, such as a software installed on a laptop, a workstation, a virtual machine, and a voice interaction system software on a mobile device including a tablet or a phone that can be used by a human customer service or real users, which all belongs to the scope of the embodiments of the present disclosure.

Through the RPA technology based on a browser interface or system desktop control, or other process operation automation technologies, such as taking a web page of a browser agent workbench of the call center as the operation terminal of the voice interaction system as an example, this method will startup a browser instance, and bind an input/output apparatus of the browser instance to two idle virtual sound card apparatuses respectively. After the browser instance is initialized, according to a process automation step defined by a template, a real human customer service personnel is simulated to log in to the cloud call center system and use the telephone communication function of the system.

A Voicebot client 107 executing method refers to starting a client program of a Voicebot. This program may be local or connected to a Voicebot server. A Voicebot Agent service instance can be woken up by a specified interface and parameter.

The integration scenario of the call center can be taken as an example. Through an audio forwarding method based on the virtual sound card, an input audio of a Voicebot Agent client program comes from an output audio in an operation terminal of the call center platform, that is, a voice of a user dialing in a call or answering a call. The audio will be sent to a Voicebot Agent instance for processing such as a speech recognition, an intent recognition, and a speech synthesis, and then finally a reply audio is generated. The Voicebot Agent client plays the reply audio after obtaining it, and uses the audio as the input audio of an operation terminal of the call center platform, and finally realizes a voice conversation interaction between the Voicebot Agent and a telephone user.

In some other embodiments of the present disclosure, a method for intelligent interaction integration is also provided, including: step 1, loading a virtual sound card module and an audio loopback module 105, where the virtual sound card module includes at least two virtual sound card units; step 2, reproducing, through an automation module of a voice interaction system, operations that a real person logs into a voice interaction operation terminal and performs a voice interaction service, and initializing one first running instance for automating the voice interaction service on the voice interaction operation terminal and, configuring a sound output apparatus as a first virtual sound card unit and a sound input unit as a second virtual sound card unit for the first running instance; step 3, running the first running instance and logging in a first account, wherein the first account is used for monitoring whether there is a voice data of an incoming call to be processed, and wherein when there is a voice data of an incoming call being assigned to the first account, the first running instance captures a first telephone event of the incoming call; step 4, clicking, by the first running instance according to the first telephone event, a page element to answer the first telephone event, and waking up a first voice robot instance on a voice robot client, wherein a sound input apparatus of the voice robot client is the first virtual sound card unit, and a sound output apparatus of the voice robot is the second virtual sound card unit; step 5, after the first telephone event is connected, outputting, by the first running instance, a first audio of a user dialing in the first telephone event to the first virtual sound card unit, and then inputting the first audio to the voice robot client, so that the first audio is identified and processed by the voice robot server 108; step 6, returning, by the voice robot server 108, a corresponding second audio for the first audio, and outputting, by the voice robot client, the second audio to the first running instance through the second virtual sound card unit; and step 7, sending, by the first running instance, the second audio to the user dialing in the first telephone event.

In order to clearly illustrate the specific implementation process of the embodiment of the present disclosure, an implementation case of integrating the Voicebot Agent into the cloud call center platform is used below, in conjunction with FIG. 2, to illustrate a method for realizing an integration of a Voicebot with a call center or a voice interaction system based on a virtual sound card according to the embodiments of the present disclosure. This implementation case includes the following implementation steps S1-S7.

In S1, a virtual sound card and an audio loopback module 105 are loaded, and a virtual sound card A 104 and a virtual sound card B 103 are configured as full-duplex sound input/output apparatuses according to an implementation scenario.

In S2, for a cloud call center platform that needs to integrate a Voicebot Agent, a web page of an human agent workbench of this platform is taken as an example, operation steps that a real human customer service use a web end of the cloud call center platform are analyzed and recorded, and the operation steps are configured as a data structure that a browser process automation module can understand, that is a recorded operation steps are executed by the browser process automation module, which can reproduce operations that a real human customer service logs in a cloud call center platform, and can execute operations of outbound call tasks or answering incoming calls.

S3, an automation control module such as RPA (Robotic process automation) or a browser Web driver automation tool on an operation terminal is used to initialize a browser process automation running instance. A sound output apparatus is configured as a virtual sound card A 104 and a sound input apparatus is configured as a virtual sound card B 103 for this running instance.

It should be noted that a terminal application of the call center platform or the voice interaction system is not limited to a mode of a software application or a web application, such as a software installed on a laptop, a workstation, a virtual machine, and a voice interaction platform software on a mobile device including a tablet or a phone that can be used by a human customer service or real users, which all belongs to the scope of the embodiments of the present disclosure.

It should be noted that an automation control module such as a RPA (Robotic process automation) on an operation terminal include but are not limited to a RPA module based on a browser interface or a desktop control, or other certain software modules based on an interface that can automatically control the above-mentioned voice interaction system. Any mode that uses a browser or other application program on an automation control terminal to simulate various operations of real human customer service falls within the scope of the embodiments of the present disclosure.

S4, after the browser process automation running instance is successfully initialized, the operation steps of the human customer service configured in step S1 on the cloud call center platform are analyzed, and a real human customer service that logs onto the platform and enters a workbench page of a human agent is simulated. An incoming call answering scenario is taken as an example, a status of a currently logged-in human customer service account is set by a running instance as online, and whether there is an incoming call to be processed is monitored by grabbing a page element.

S5, when an incoming call is assigned to the human customer service account currently logged-in, this incoming call event is captured by the browser process automation running instance through monitoring a property change of the page element.

S6, when an incoming event is captured, two actions need to be executed the browser process automation running instance. First, the call is answered by the running instance by clicking on the page element according to a configuration in step 1; second, the Voicebot Agent client module is notified through an interface invoking or other means to wake up one Voicebot Agent instance for performing a voice interaction.

S7, the Voicebot Agent client module is one of the unique modules constituting the embodiments of the present disclosure, and its function is mainly to perform a voice interaction with the Voicebot Agent system. The module when being initialized also needs to be configured with a sound output apparatus and a sound input apparatus. It can be assumed that in current implementation, a virtual sound card B 103 is configured as a sound output apparatus, and a virtual sound card A 104 is configured as a sound input apparatus.

It should be noted that, according to different access protocols of the Voicebot Agent platform, the Voicebot Agent client module supports a P2P voice communication with SIP/RTP, or based on Websocket and other related protocols. The access protocols listed in this implementation example are only for illustrating the embodiments of the present disclosure, and are not used to limit the scope of protection scope of the embodiments of the present disclosure.

S8, after a call is connected, a voice of a user dialing an incoming call is outputted by the browser process automation running instance to the virtual sound card A 104; because the virtual sound card A 104 is the sound input apparatus of the Voicebot Agent client module, the voice robot customer service client module can obtain the voice of the user dialing the incoming call, and then send it to the Voicebot Agent platform for identification and processing.

S9, the Voicebot Agent platform which is implemented through an independent algorithm performs an ASR 302 recognition on a received audio. ASR 302 refers to automatic speech recognition technology. It is used to processes human voice into text message. A user-expressed voice audio streams is converted by an ASR 302 module which converts it into text messages. The text messages expressed by a user is processed by a series of processing such as a conversation management, a Text-to-speech (TTS 303) audio synthesis, etc., and then an answering audio is returned by the Voicebot Agent for answering the user-expressed voice audio streams. TTS 303 refers to Text-to-speech technology which converts texts or words from digital devices such as a computer into audio streams.

S10, a sound of the answering audio is outputted by the Voicebot Agent client module, after receiving the answering audio, to the virtual sound card B 103. Because the virtual sound card B 103 is the sound input apparatus of the browser process automation running instance, thus the browser process automation running instance can obtain an audio stream of the answering audio in real time and play it to a user who dialed in the incoming call. So far, a voice conversation process is completed.

In some embodiments, all or part of the steps in the various methods of the above embodiments can be completed by instructing a hardware related to a terminal apparatus through a program. The program can be stored in a computer-readable storage medium. The storage medium may include: a flash disk, a read-only memory (Read-Only Memory, ROM), a random-access apparatus (Random Access Memory, RAM), a magnetic disk or an optical disk, etc.

In some embodiments, if a Voicebot agent cannot find an answer to a question of a customer or a customer is not satisfied with answers that a voicebot agent provided, a real human agent specialized in the area of interests of the customer will be connected by the voicebot agent to the system. The real human agent will provide input to the questions of the customer to the voicebot agent. The voicebot agent will store the new information provided by the real human agent into its database and at the same time send the new information to the customer.

In some embodiments, a voice identification module is added to the present disclosure to connect to the audio input apparatus of this application. The voice identification module is also connected to the voicebot. A voice identification module uses unique biological characteristics of a voice of a person to create a voiceprint of that person. After an audio signal is received by the sound input apparatus, the audio signal will be processed by the voice identification module and the data of the voice identification information will be saved into the database of voicebot for security, privacy, identification, or other purposes. This information will be available to the voicebot for future usage.

Figure 3:
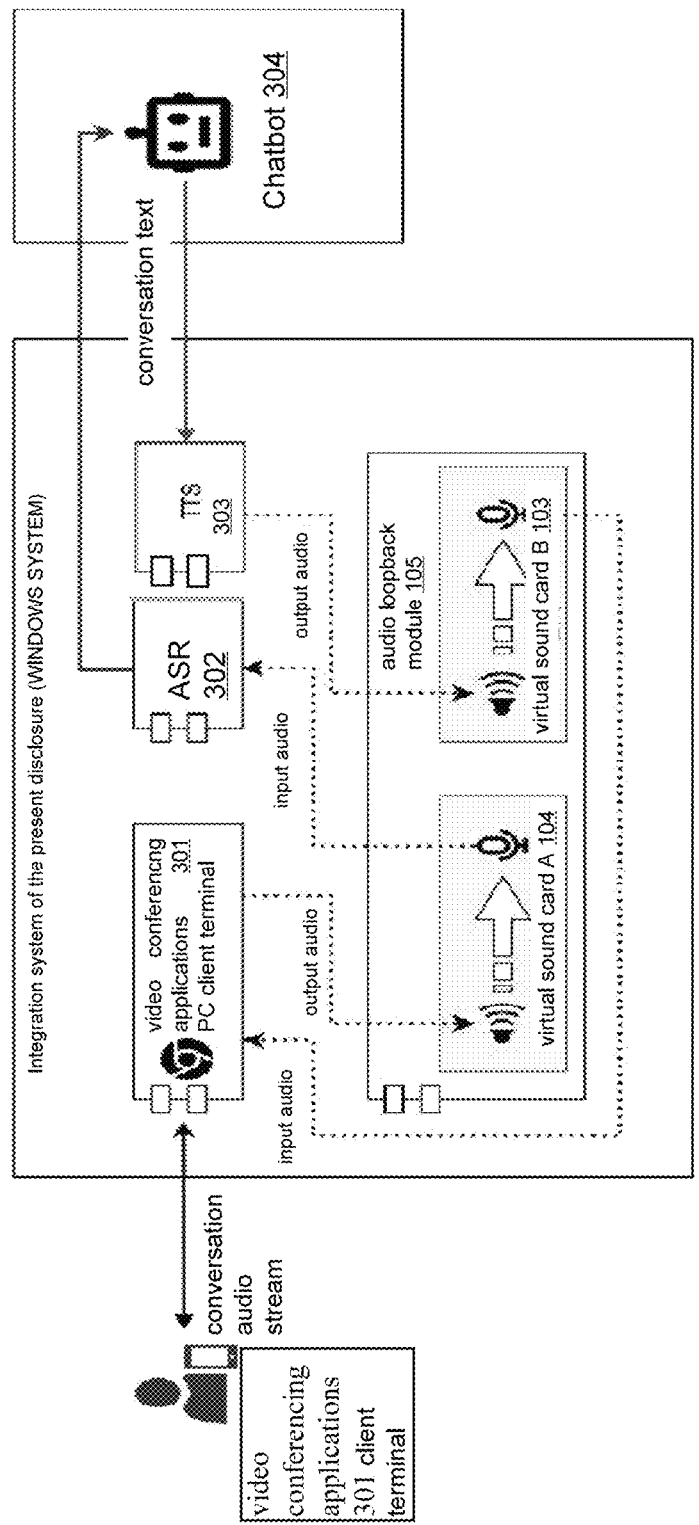
FIG. 3 is a structural diagram of a second optional intelligent interaction integration method according to some embodiments of the present disclosure.

In one scenario of the present disclosure shown in FIG. 3, current available voice interaction system can be integrated into the present disclosure to simulate a customer service desk. An audio transmission device is proposed, including a virtual sound card module and an audio forwarding module, wherein the virtual sound card module is configured to: receive a first audio sent by a voice interaction system, and forward the first audio to an intelligent voice platform 106 through the audio loopback module 105; and/or receive a second audio sent by the intelligent voice platform 106, and forward the second audio to the voice interaction system through the audio loopback module 105.

It should be noted that an audio forwarding method based on a virtual sound card provided in the embodiments of the present disclosure refers to forwarding an input audio stream and an output audio stream between multiple virtual sound card apparatuses in real time through the audio loopback module 105, so as to realize an audio transmission between two programs.

A virtual sound card used in some embodiments of the present disclosure may be a commercial software of which a license is needed to be purchased, or may be an open-source audio framework. According to different integration application scenarios of the present disclosure embodiment, a virtual sound card in simplex mode may be used, that is, a single virtual sound card apparatus may only be used as an input apparatus of audio or an output apparatus of audio, and may only be linked with one sound program at the same time. A virtual sound card in full-duplex mode may also be used, thus multiple sound programs are supported to be inputted into one virtual sound card apparatus at the same time, and multiple programs are also supported to obtain sound from this virtual sound card apparatus at the same time.

The audio loopback module 105 can be configured to be capable of completing a configuration of a virtual sound card for audio forwarding according to an integration scenario, and allocating an available virtual sound card apparatus for programs that require audio interaction.

A virtual sound card module includes: a first sound card unit, configured to receive the first audio sent by the voice interaction system, and forward the first audio to the intelligent voice platform 106 through the audio loopback module 105; a second sound card unit, configured to receive the second audio sent by the intelligent voice platform 106, and forward the second audio to the voice interaction system through the audio loopback module 105.

The first audio includes at least one voice data stream, and the second audio includes at least one voice data stream, wherein the first audio is a response to the second audio, or the second audio is a response to the first audio.

An intelligent interaction integration platform is also provided, including the above-mentioned audio transmission device, the intelligent interaction integration platform also includes: a voice interaction system and an intelligent voice platform 106, where the voice interaction system includes a voice interaction server and a voice interaction operation terminal, the intelligent voice platform 106 includes a voice robot server 108. Where the voice interaction server is configured to: receive a first audio sent by a user terminal, and forward the first audio to the voice interaction operation terminal; the voice interaction operation terminal is configured to: send a received first audio to the audio transmission module; the audio transmission module is configured to: send the first audio to the voice robot server 108, and receive a second audio sent by the voice robot server 108, and then send the second audio to the audio transmission module; the audio transmission module is also configured to: send the second audio to the voice interaction operation terminal; the voice interaction operation terminal is also configured to: send a received second audio to the voice interaction server; the voice interaction server is also configured to: send the second audio to the user terminal.

One scenario of the above embodiment is as follows. A communications platform that allows users to connect with video, audio, phone and chat such as some video conferencing applications 301 can be integrated into the present application. When a video conference user calls into the voice interaction system of the present application integrated with video conference, a conversation audio stream from the video conference user is captured by the voice interaction system operation terminal 102. The conversation audio stream is output into a virtual sound card in an audio loopback module 105. The virtual sound card converts the conversation audio stream into a second audio stream, which in turn is input into an ASR 302 in the intelligent voice platform 106 voice robot server 108. ASR 302 converts the second audio stream into text messages which are sent to a chatbot 304 for processing. Chatbot 304 is a conversational user interface to communicate with digital devices, which allows a user to communicate using text messages in a conversational way. Chatbot 304 and voicebot are both conversational user interface, while Chatbot 304 uses text messages and voicebot uses voice messages to interact with a user.

Chatbot 304 uses artificial intelligence and natural language processing to understand the text messages of the video conference user and generates text responses. The automated text responses are transmitted to TTS 303.

TTS 303 converts the automated text responses into a third audio stream. The third audio stream is sent into another virtual sound card in the audio loopback module 105 for processing. The processed third audio stream is input into the video conference application PC client terminal. The video conference application PC client terminal replies to the video conference client with the third audio stream simulating human conversations.

Figure 4:
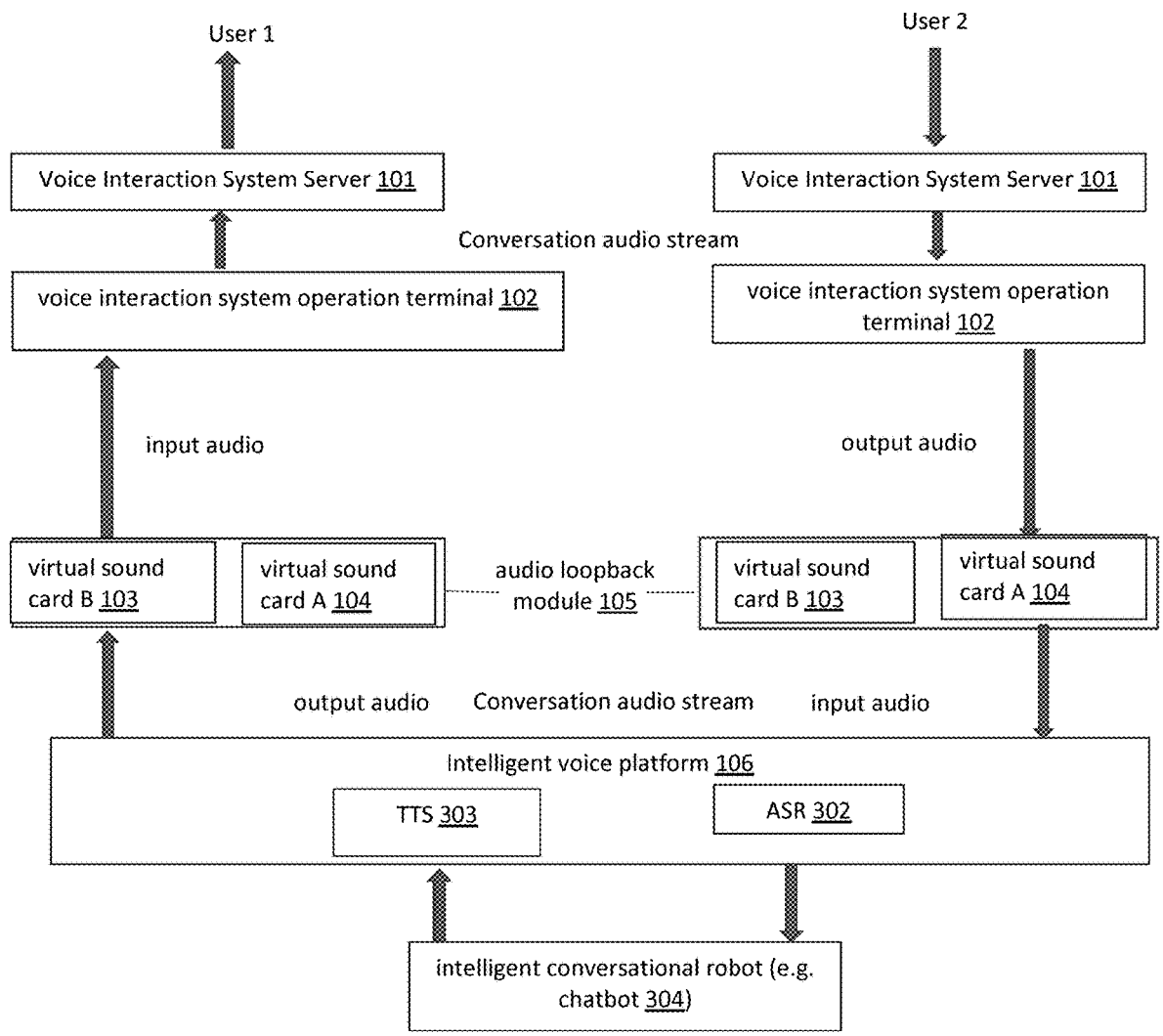
FIG. 4 is a flowchart of a third optional intelligent interaction integration method according to some embodiments of the present disclosure.

In some other embodiments of the present disclosure shown in FIG. 4, users can use the present method/device to communicate with each other with a different experience. An audio transmission device is proposed, including a virtual sound card module and an audio forwarding module, wherein the virtual sound card module is configured to: receive a first audio sent by a voice interaction system, and forward the first audio to an intelligent voice platform 106 through the audio loopback module 105; and/or receive a second audio sent by the intelligent voice platform 106, and forward the second audio to the voice interaction system through the audio loopback module 105.

It should be noted that an audio forwarding method based on a virtual sound card provided in the embodiments of the present disclosure refers to forwarding an input audio stream and an output audio stream between multiple virtual sound card apparatuses in real time through the audio loopback module 105, so as to realize an audio transmission between two programs.

A virtual sound card used in some embodiments of the present disclosure may be a commercial software of which a license may need to be obtained, or may be an open-source audio framework. According to different integration application scenarios of the present disclosure embodiment, a virtual sound card in simplex mode may be used, that is, a single virtual sound card apparatus may only be used as an input apparatus of audio or an output apparatus of audio, and may only be linked with one sound program at the same time. A virtual sound card in full-duplex mode may also be used, thus multiple sound programs are supported to be inputted into one virtual sound card apparatus at the same time, and multiple programs are also supported to obtain sound from this virtual sound card apparatus at the same time.

The audio loopback module 105 can be configured to be capable of completing a configuration of a virtual sound card for audio forwarding according to an integration scenario, and allocating an available virtual sound card apparatus for programs that require audio interaction.

A virtual sound card module includes: a first sound card unit, configured to receive the first audio sent by the voice interaction system, and forward the first audio to the intelligent voice platform 106 through the audio loopback module 105; a second sound card unit, configured to receive the second audio sent by the intelligent voice platform 106, and forward the second audio to the voice interaction system through the audio loopback module 105.

The first audio includes at least one voice data stream, and the second audio includes at least one voice data stream, wherein the first audio is a response to the second audio, or the second audio is a response to the first audio.

In some embodiments, an intelligent interaction integration platform is also provided, including the above-mentioned audio transmission device, the intelligent interaction integration platform also includes: a voice interaction system and an intelligent voice platform 106, where the voice interaction system includes a voice interaction server and a voice interaction operation terminal, the intelligent voice platform 106 includes a voice robot server 108. Where the voice interaction server is configured to: receive a first audio sent by a user terminal, and forward the first audio to the voice interaction operation terminal; the voice interaction operation terminal is configured to: send a received first audio to the audio transmission module; the audio transmission module is configured to: send the first audio to the voice robot server 108, and receive a second audio sent by the voice robot server 108; the audio transmission module is also configured to: send the second audio to the voice interaction operation terminal; the voice interaction operation terminal is also configured to: send a received second audio to the voice interaction server; the voice interaction server is also configured to: send the second audio to the user terminal.

A communications platform that allows users to connect with video, audio, phone and chat such as some video conferencing applications 301 can be integrated into the present application. When a first video conference user calls into the voice interaction system of the present application integrated with video conference using his or her own language (i.e., a first language), a conversation audio stream from the first video conference user is captured by the voice interaction system operation terminal 102. The conversation audio stream is output into a virtual sound card in an audio loopback module 105. The virtual sound card converts the conversation audio stream into a second audio stream, which in turn is input into an ASR 302 in the intelligent voice platform 106 voice robot server 108. ASR 302 converts the second audio stream into text messages which are sent to a chatbot 304 for processing.

Chatbot 304 uses artificial intelligence and natural language processing to understand the text messages of the first messaging application user and generates text responses in a language of a second user whom the first messaging application user calls to speak with. The text responses generated by the Chatbot 304 are transmitted to TTS 303.

TTS 303 converts the automated text responses into a third audio stream. The third audio stream is sent into another virtual sound card for processing. The processed third audio stream is input into a video conference application PC client terminal of the second video conference user. The second video conference user hears the conversation from the first video conference user in the second video conference user's own language which he or she can understand.

The second video conference user then responses to the conversation from the first video conference user using his or her own language (i.e., the second language). A conversation audio stream from the second video conference user is captured by a voice interaction system operation terminal 102. The conversation audio stream is output into a virtual sound card in an audio loopback module 105. The virtual sound card converts the conversation audio stream into a second audio stream, which in turn is input into an ASR 302 in the intelligent voice platform 106 voice robot server 108. ASR 302 converts the second audio stream into text messages which are sent to a Chatbot 304 for processing.

Chatbot 304 uses artificial intelligence and natural language processing to understand the text messages of the second voice conference application user and generates text responses in a language of the first user whom the second voice conference application user is speaking with. The text responses generated by the Chatbot 304 are transmitted to TTS 303.

TTS 303 converts the automated text responses into a third audio stream. The third audio stream is sent into another virtual sound card for processing. The processed third audio stream is input into the video conference application PC client terminal of the first application user. The first video conference user hears the conversation from the second video conference user in the first video conference user's own language which he or she can understand.

As the AI technology progresses, the speed of the processing of Chatbot 304 is increasing rapidly, the two video conference application users can talk easily with each other without feeling any delays using two different languages.

In some other embodiments of the present disclosure, an intelligent voice robot 109 module may be generated by integrating ASR 302, TTS 303, Chatbot 304, and other systems. This intelligent voice robot 109 module is connected with an audio loopback module 105. The audio loopback module 105 consists of at least a first virtual sound card and at least a second virtual sound card. The audio loopback module 105 is connected with a voice interaction system operation terminal 102. The voice interaction system operation terminal 102 is connected with a voice interaction system server 101.

The audio loopback module 105 is configured to: receive a first audio sent by a voice interaction system, and forward the first audio to an intelligent voice robot 109; and/or receive a second audio sent by the intelligent voice robot 109, and forward the second audio to the voice interaction system.

It should be noted that an audio forwarding method based on a virtual sound card provided in the embodiments of the present disclosure refers to forwarding an input audio stream and an output audio stream between multiple virtual sound card apparatuses in real time through the audio loopback module 105, so as to realize an audio transmission between two programs.

A voice interaction system is provided, including the above-mentioned audio transmission device, and the voice interaction system also includes a voice interaction server and a voice interaction operation terminal, where the voice interaction server is configured to: receive a third audio sent by a user, and send the third audio to the voice interaction operation terminal. The voice interaction operation terminal is configured to: send the third audio to the audio transmission device; and/or receive a fourth audio sent by the audio transmission device, and send the fourth audio to the voice interaction server. The voice interaction server is further configured to: send the fourth audio to a user.

A voice commend can be sent from a user to the voice interaction server and the audio stream of the voice commend travels from the voice interaction server to the voice interaction operation terminal. The voice interaction operation terminal outputs an audio stream to a virtual sound card A 104 in an audio loopback module 105. The audio stream is processed by the virtual sound card A 104 and input into an intelligent voice robot 109 module. The intelligent voice robot 109 module further processes the audio stream by converting the audio stream into text data, and the text data is processed by the chatbot 304 in the intelligent voice robot 109 module and a text response is generated. The text response is converted into an audio stream by a TTS 303 inside of the intelligent voice robot 109 module. The audio stream is output to a virtual sound card B 103 in the audio loopback module 105. The virtual sound card B 103 then input the audio stream into the voice interaction system operation terminal 102. The voice interaction system operation terminal 102 transmits the response to the voice interaction system server 101 and the user gets this audio response.

At the same time, an intelligent voice robot 109 module may contain or connect to other systems or hard wares. After the intelligent voice robot 109 module processes the audio stream by converting the audio stream into text data, the chatbot 304 inside of the intelligent voice robot 109 module can convert the text data to a prompt which can prompt a series of actions of other systems or hard wares such as printing, playing music, calling someone etc. or the chatbot 304 inside of the intelligent voice robot 109 module can convert the text data to a computer program which can prompt a series of actions of the other systems or hard wares.

Figure 5:
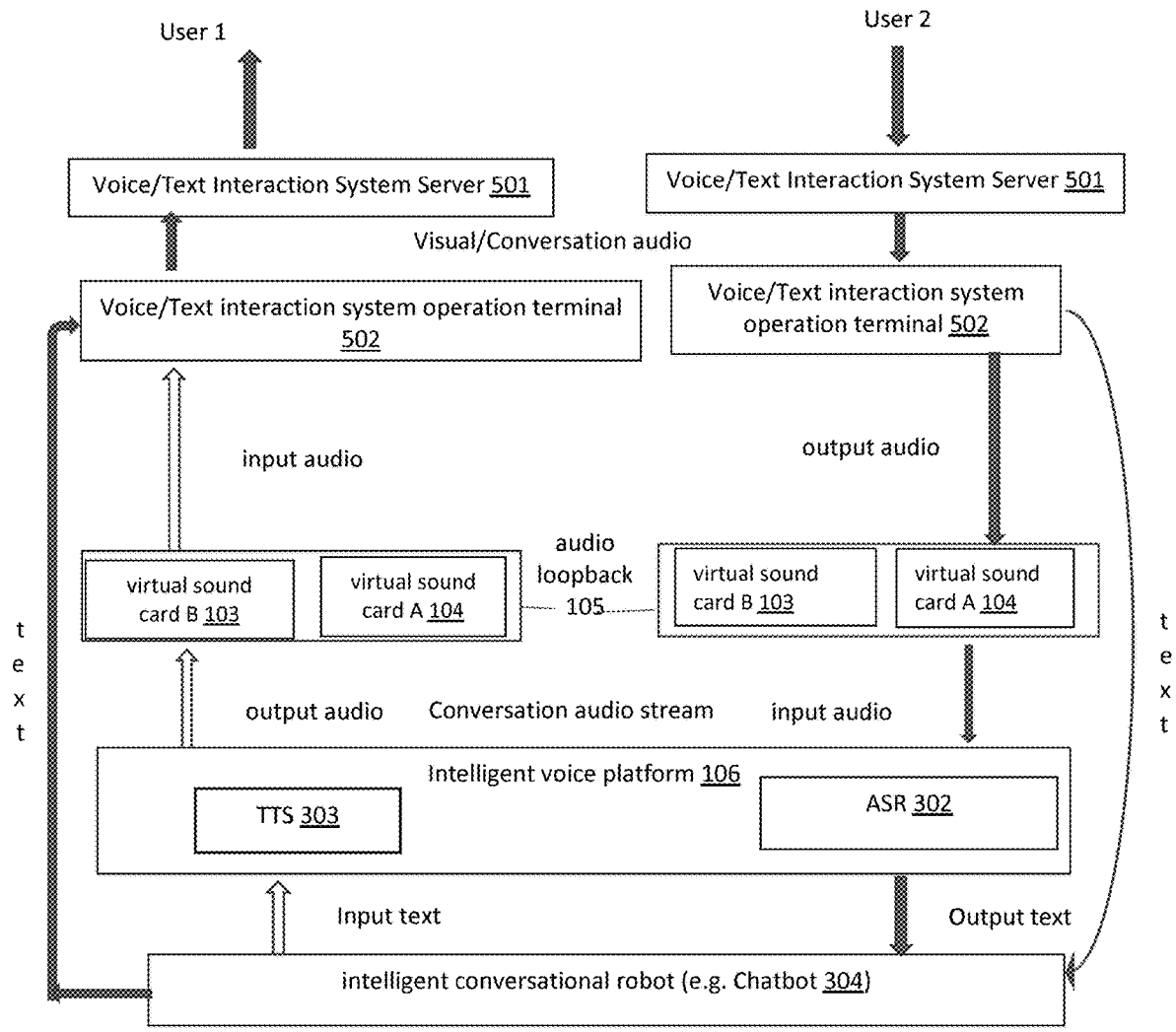
FIG. 5 is a flowchart of a fourth optional intelligent interaction integration method according to some embodiments of the present disclosure.

In some other embodiments of the present disclosure shown in FIG. 5, users who are deaf, or have a hearing impairment and/or speech impairment can use a voice/text interaction system operation terminal such as some messaging applications to connect to the device/method provided by the present disclosure to convert voice to text, text to voice, or a sign language (e.g., Auslan) to voice to communicate with any other people without any difficulties which simulates the tasks that the National Relay Service (NRS) provides—a 24-hour phone service for people who are deaf, or have a hearing impairment and/or speech impairment. The NRS uses specially trained staff, called relay officers, who convert voice to text, text to voice, or Auslan to English to provide communication service to those who are deaf, or have a hearing impairment and/or speech impairment. The usage of the present disclosure in this setting will greatly save human and material resources and provide better and convenient service to the people needed.

Currently, users who are deaf, hearing challenged, or speech-impaired can also use TTY to communicate. TTY is a special device that allows users to use a telephone to type text messages to exchange information. A TTY is required at both ends of the conversation in order to communicate. The present disclosure will provide these people in need a more flexible and natural way to contact others.

In one aspect of the present disclosure, an audio transmission device is proposed, including a virtual sound card module and an audio loopback module 105, where the virtual sound card module is configured to: receive a first audio sent by a voice interaction system, and forward the first audio to the intelligent voice platform 106 through the audio loopback module 105; and/or receive a second audio sent by the intelligent voice platform 106, and forward the second audio to the voice interaction system through the audio loopback module 105.

The virtual sound card module includes at least two virtual sound card units, where the virtual sound card unit is in simplex mode or full duplex mode.

A virtual sound card module includes: a first sound card unit, configured to receive the first audio sent by the voice interaction system, and forward the first audio to the intelligent voice platform 106 through the audio loopback module 105; a second sound card unit, configured to receive the second audio sent by the intelligent voice platform 106, and forward the second audio to the voice interaction system through the audio loopback module 105.

The first audio includes at least one voice data stream, and the second audio includes at least one voice data stream, where the first audio is a response to the second audio, or the second audio is a response to the first audio.

A voice/text interaction system is also provided, including the above-mentioned audio transmission device, and the voice/text interaction system also includes a voice/text interaction system server 501 and a voice/text interaction system operation terminal 502, where the voice/text interaction system server 501 is configured to: receive a third audio sent by a user, and send the third audio to the voice/text interaction system operation terminal 502. The voice/text interaction system operation terminal 502 is configured to: send the third audio to the audio transmission device; and/or receive a fourth audio sent by the audio transmission device, and send the fourth audio to the voice/text interaction system server 501. The voice/text interaction system server 501 is further configured to: send the fourth audio to a user. The voice/text interaction system server 501 is also configured to: receive a text message sent by a user, and send this text message to the voice/text interaction system operation terminal 502. The voice/text interaction system operation terminal 502 sends the text message to the intelligent voice robot 109 e.g., Chatbot 304. The intelligent voice robot 109 can send the text message to the intelligent voice platform 106 or send the text message directly to another user's voice/text interaction system operation terminal 502.

An intelligent voice platform 106 is also provided, including the above-mentioned audio transmission device. The intelligent voice platform 106 also includes a voice robot server 108, where the voice robot server 108 is configured to: receive a fifth audio sent by the audio transmission module, and send the sixth audios to the audio transmission device. The intelligent voice robot 109 can also send the text message directly to another user's voice/text interaction system operation terminal 502.

In one scenario, a first user who is deaf, or has a hearing impairment and/or speech impairment can login to a voice/text interaction system operation terminal 502 such as some messaging applications to send a text message. This text message is directly sent to the intelligent voice robot 109 for processing such as converting written language to speaking language or converting one language to another if necessary. The processed text message is then input into TTS 303 inside of the intelligent voice platform 106 to output an audio stream corresponding to the processed text message to a virtual sound card B 103 in the audio loopback module 105. The audio stream is input from the virtual sound card B 103 to the voice/text interaction system operation terminal 502 of a second user who can hear. The second user then can hear what the first user types in the text message.

In another scenario, a second user who can hear and talk can login to a voice/text interaction system operation terminal 502 such as some messaging applications to send a first audio stream. The voice/text interaction system operation terminal 502 outputs the first audio stream to a virtual sound card A 104 inside of the audio loopback module 105. A second audio stream corresponding to the first audio stream is sent from the virtual sound card A 104 to input into an ASR 302 in the intelligent voice platform 106 to convert to a text message. The text message is directly output to a first user's voice/text interaction system operation terminal 502 such as some messaging applications.

In this way, a user who is deaf, or has a hearing impairment and/or speech impairment can exchange information with another user who can hear and talk in a convenient voice/text mixed model.

In some embodiments, a pattern recognition technology is integrated into a voice/text interaction system such as some messaging, voice conference or video applications, Auslan by a user who is deaf, or has a hearing impairment and/or speech impairment can be translated into a text message, this text message is directly sent to the intelligent voice robot 109 for processing such as converting written language to speaking language or converting one language to another if necessary. The processed text message is then input into TTS 303 inside of the intelligent voice platform 106 to output an audio stream corresponding to the processed text message to a virtual sound card B 103 in the audio loopback module 105. The audio stream is input from the virtual sound card B 103 to the voice/text interaction system operation terminal 502 of a second user who can hear. The second user then can hear what the first user expresses in his or her Auslan.

In this way, a user who is deaf, or has a hearing impairment and/or speech impairment can exchange information with another user who can hear and talk in a convenient voice/Auslan mixed model. The National Relay Service can be provided to those who are deaf, or have a hearing impairment and/or speech impairment by the method/device of the present disclosure.

Figure 6:
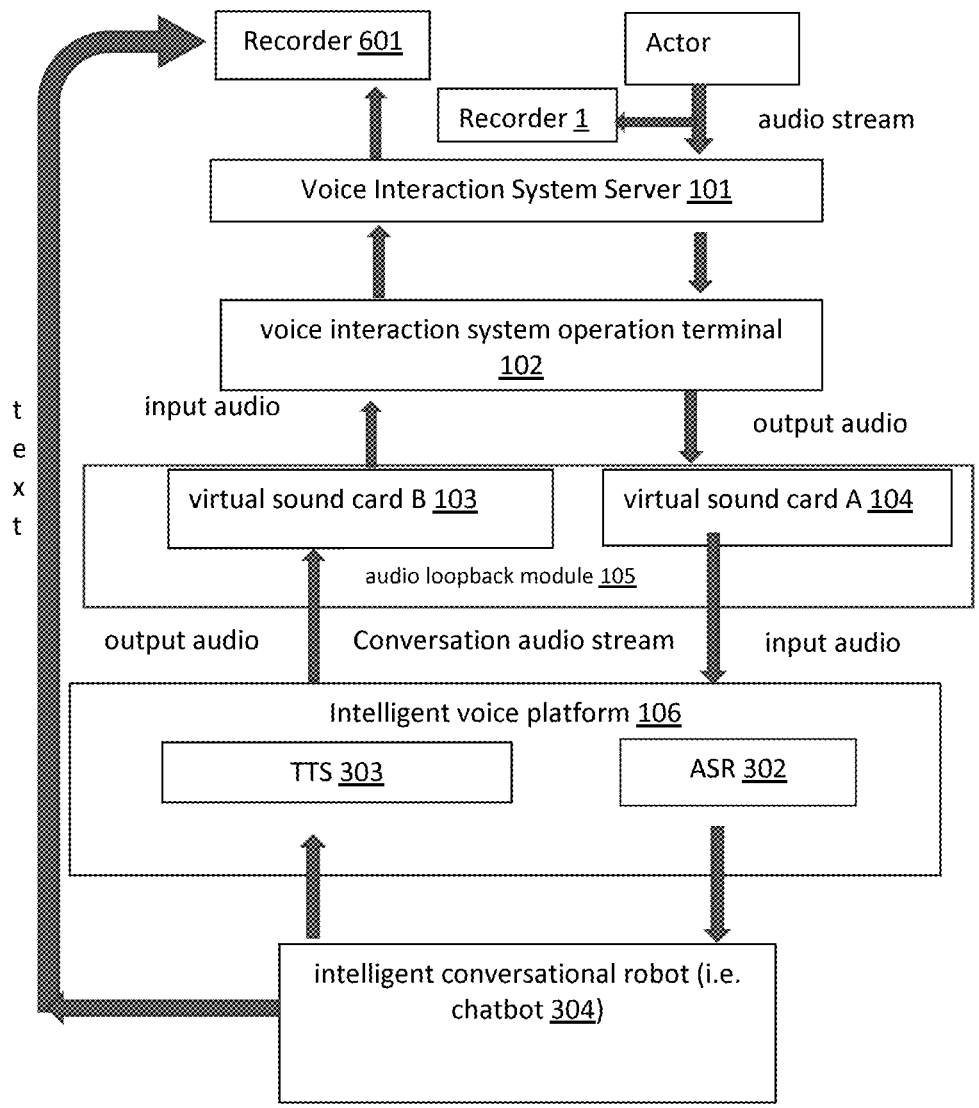
FIG. 6 is a flowchart of a fifth optional intelligent interaction integration method according to some embodiments of the present disclosure.

In another example of the present disclosure shown in FIG. 6, the present disclosure can be modified to do voice recording for a film/video, which will hugely decrease the cost of film/video making and decrease the time to produce a film/video.

In some embodiments, an audio transmission device is provided, including a virtual sound card module and an audio forwarding module, wherein the virtual sound card module is configured to: receive a first audio sent by a voice interaction system, and forward the first audio to an intelligent voice platform 106 through the audio loopback module 105; and/or receive a second audio sent by the intelligent voice platform 106, and forward the second audio to the voice interaction system through the audio loopback module 105.

It should be noted that an audio forwarding method based on a virtual sound card provided in the embodiments of the present disclosure refers to forwarding an input audio stream and an output audio stream between multiple virtual sound card apparatuses in real time through the audio loopback module 105, so as to realize an audio transmission between two programs.

A virtual sound card used in some embodiments of the present disclosure may comprise a commercial software of which a license may need to be purchased, or may be an open-source audio framework.

According to different integration application scenarios of the present disclosure, a virtual sound card in simplex mode may be used, that is, a single virtual sound card apparatus may only be used as an input apparatus of audio or an output apparatus of audio, and may only be linked with one sound program at the same time. A virtual sound card in full-duplex mode may also be used, thus multiple sound programs are supported to be inputted into one virtual sound card apparatus at the same time, and multiple programs are also supported to obtain sound from this virtual sound card apparatus at the same time.

The audio loopback module 105 can be configured to be capable of completing a configuration of a virtual sound card for audio forwarding according to an integration scenario, and allocating an available virtual sound card apparatus for programs that require audio interaction.

A virtual sound card module includes: a first sound card unit, configured to receive the first audio sent by the voice interaction system, and forward the first audio to the intelligent voice platform 106 through the audio loopback module 105; a second sound card unit, configured to receive the second audio sent by the intelligent voice platform 106, and forward the second audio to the voice interaction system through the audio loopback module 105.

In some embodiments, the first audio includes at least one voice data stream, and the second audio includes at least one voice data stream, wherein the first audio is a response to the second audio, or the second audio is a response to the first audio.

A voice interaction system is also provided, including the above-mentioned audio transmission device, and the voice interaction system also includes a voice interaction server (that is, the voice interaction system server 101 in FIG. 6) and a voice interaction operation terminal (that is, the voice interaction system operation terminal 102 in FIG. 6), where the voice interaction server is configured to: receive a third audio sent by a user, and send the third audio to the voice interaction operation terminal. The voice interaction operation terminal is configured to: send the third audio to the audio transmission device; and/or receive a fourth audio sent by the audio transmission device, and send the fourth audio to the voice interaction server. The voice interaction server is further configured to: send the fourth audio to a recorder 601.

An intelligent voice platform 106 is also provided, including the above-mentioned audio transmission device. The intelligent voice platform 106 also includes a voice robot server 108 and a voice robot client, where the voice robot client is configured to: receive a fifth audio sent by the audio transmission module, and send the fifth audio to the voice robot server 108; and/or receive a sixth audio sent by the voice robot server 108, and send the sixth audio to the audio transmission device. In this case, the voice robot client includes an ASR 302 and a TTS 303 or similar applications.

In some embodiments, a smart (or "intelligent") interaction integration platform can also be provided, including the above-mentioned audio transmission device, the intelligent interaction integration platform also includes: a voice interaction system and an intelligent voice platform 106, where the voice interaction system includes a voice interaction server and a voice interaction operation terminal, and wherein the intelligent voice platform 106 includes a voice robot server 108 (i.e., the intelligent voice robot 109 in FIG. 6) and a voice robot client (i.e., ASR 302 and TTS 303 in FIG. 6).

The voice interaction server can be configured to: receive a first audio sent by a user terminal, and forward the first audio to the voice interaction operation terminal; the voice interaction operation terminal is configured to: send a received first audio to the audio transmission module; the audio transmission module is configured to: send the first audio to the voice robot client; the voice robot client is configured to: send the first audio to the voice robot server 108, and receive the second audio sent by the voice robot server 108, and then send the second audio to the audio transmission module; the audio transmission module is also configured to: send the second audio to the voice interaction operation terminal; the voice interaction operation terminal is also configured to: send a received second audio to the voice interaction server; and the voice interaction server is also configured to: send the second audio to the recorder 601.

In making a movie, TV show, or animation scene, an actor's voice (an audio stream) is transmitted to a voice interaction system server 101 and recorded in recorder 1.

At the same time, the audio stream is sent by the voice interaction system server 101 to a voice interaction system operation terminal 102. The voice interaction system operation terminal 102 then output the audio stream to a virtual sound card A 104 in an audio loopback module 105. The virtual sound card A 104 inputs the audio stream into ASR 302 or similar applications in the intelligent voice platform 106. ASR 302 converts the audio stream into a text message or any form of data that a robot can use. The text message is sent by the ASR 302 to an intelligent voice robot 109 to change to another language. The text message in another language is sent by the intelligent voice robot 109 to a TTS 303 in the intelligent voice platform 106. TTS 303 then output a second audio stream, which is corresponding to the text message sent by the intelligent voice robot 109, to a virtual sound card B 103 in an audio loopback module 105. The virtual sound card B 103 then inputs the second audio stream into a voice interaction system operation terminal 102. The voice interaction system operation terminal 102 sends the second audio stream to a voice interaction system server 101. The voice interaction system server 101 then sends the second audio stream to a recorder 601.

In this way, in making a movie, TV, or animation scene, two sets of voice acting are recorded almost at the same time, making it easy for later editing. In this example, the two sets of voices are in two different languages. They can be of two difference voice sounds, etc. In some embodiments, a text message of the subtitle of the audio stream can be output to the recorder 601 simultaneously. The application of the present disclosure in this setting will greatly decrease the cost of film/video making and decrease the time to produce a film, movie, TV show, or animation.

The serial numbers of the above embodiments of the present disclosure are for description only, and do not represent the advantages and disadvantages of the embodiments.

If an integrated unit in the above embodiments is implemented in the form of a software function unit and sold or used as an independent product, it can be stored in the above computer-readable storage medium. Based on this understanding, an essential part or a part being contributed to the prior art of the technical solution of the present disclosure, or all or part of the technical solution may be embodied in the form of a computer software product. The computer software product is stored in a storage medium including several instructions to make one or more computer apparatus (which may be a personal computer, a server or a network apparatus, etc.) executing all or part of the steps of the methods described in the various embodiments of the present disclosure.

The various device components, circuits, units, blocks, or portions may have modular configurations, or are composed of discrete components, but nonetheless can be referred to as "modules," "components," or "circuits" in general. In other words, the "components," "modules," "blocks," "circuits," "portions," or "units" referred to herein may or may not be in modular forms, and these phrases may be interchangeably used.

In the present disclosure, the terms "installed," "connected," "coupled," "fixed", etc., shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," etc., can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium refers to any physical or electronic medium that can store digital data without being subject to immediate deletion or alteration, such as a ROM, a CD-ROM, a magnetic tape, a floppy disk, optical data storage equipment, a flash drive such as a USB drive or an SD card, etc.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Processors or processing circuits refers to an electronic component or system that performs computations, manipulates data, or, execute instructions to perform actions within a device or system. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

It may be further understood that terms "first", "second", etc. are used to describe various types of information, but the information should not be limited to these terms. These terms are only used to distinguish the same type of information from each other, and do not indicate a specific order or degree of importance. In fact, expressions such as "first" and "second" may be used interchangeably. For example, without departing from the scope of the present disclosure, first information may also be referred to as second information, and similarly, the second information may also be referred to as the first information.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In several embodiments provided in the present disclosure, it should be understood that the disclosed client may be implemented in other ways. Where, device embodiments described above are only illustrative, for example, a division of the unit is only a logical function division, and there may be other division methods in actual implementation, for example, multiple units or components may be combined or may be Integrate into another system, or some features may be ignored or may not be implemented. In another point, a mutual coupling or a direct coupling or a communication connection shown or discussed may be through some interfaces, and an indirect coupling or a communication connection of units or modules may be in electrical form or other forms.

Units described as separate components may or may not be physically separated, and components shown as units may or may not be physical units, that is, they may be located in one place, or may be distributed to multiple network units. Part or all of the units can be selected according to actual needs to achieve a purpose of the solution of the embodiment.

In addition, each functional unit in each embodiment of the present disclosure may be integrated into one processing unit. Each unit may exist separately physically, or two or more units may be integrated into one unit. The above-mentioned integrated units may be implemented in the form of a hardware or in the form of a software functional unit.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. An interaction integration platform, comprising an audio transmission device, comprising a virtual sound card and an audio loopback device, wherein the virtual sound card is configured to:
  receive a first audio sent by a voice interaction system;
  forward the first audio to a voice platform through the audio loopback device;
  receive a second audio sent by the voice platform; and
  forward the second audio to the voice interaction system through the audio loopback device;
  wherein the interaction integration platform further comprises a voice interaction system and a voice platform, and wherein the voice interaction system comprises a voice interaction server and a voice interaction operation terminal, and the voice platform comprises a voice robot server and a voice robot client, wherein
  the voice interaction server is configured to receive a first audio sent by a user terminal, and forward the first audio to the voice interaction operation terminal;
  the voice interaction operation terminal is configured to send a received first audio to the audio transmission device;
  the audio transmission device is configured to send the first audio to the voice robot client;
  the voice robot client is configured to send the first audio to the voice robot server, and receive a second audio sent by the voice robot server, and then send the second audio to the audio transmission device;
  the audio transmission device is further configured to: send the second audio to the voice interaction operation terminal;
  the voice interaction operation terminal is further configured to send a received second audio to the voice interaction server; and
  the voice interaction server is further configured to send the second audio to the user terminal.

2. The interaction integration platform according to claim 1, wherein the virtual sound card comprises at least two virtual sound card devices, and wherein the at least two virtual sound card devices are in a simplex mode or a full duplex mode.

3. The interaction integration platform according to claim 1, wherein the virtual sound card comprises:
  a first sound card configured to receive the first audio sent by the voice interaction system, and forward the first audio to the intelligent voice platform through the audio loopback device; and
  a second sound card unit configured to receive the second audio sent by the voice platform, and forward the second audio to the voice interaction system through the audio loopback device.

4. The interaction integration platform according to claim 1, wherein the first audio comprises at least one voice data stream, and the second audio comprises at least one voice data stream, and wherein the first audio is a response to the second audio, or the second audio is a response to the first audio.

5. The interaction integration platform according to claim 4, wherein
  the voice interaction server is configured to:
  receive a third audio sent by a user, and send the third audio to the voice interaction operation terminal;
  the voice interaction operation terminal is configured to:
  send the third audio to the audio transmission device; receive a fourth audio sent by the audio transmission device; and send the fourth audio to the voice interaction server; and
  the voice interaction server is further configured to:
  send the fourth audio to the user.

6. The interaction integration platform according to claim 5, wherein the voice interaction server is further configured to:
  start up the voice interaction operation terminal based on a process operation automation technology, and bind an input apparatus and an output apparatus of the voice interaction operation terminal onto two idle virtual sound card devices in the virtual sound card, respectively; and
  after the voice interaction operation terminal is initialized, simulate, according to a process automation step defined by a template, a real human customer service personnel to log in the voice interaction operation terminal, and use a communication function of the voice interaction system.

7. An interaction integration method, comprising:
  step 1, loading a virtual sound card and an audio loopback device, wherein the virtual sound card comprises at least two virtual sound card devices;
  step 2, reproducing, through an automation device of a voice interaction system, operations that a real person logs into a voice interaction operation terminal and performs a voice interaction service, initializing one first running instance for automating the voice interaction service on the voice interaction operation terminal, and configuring a sound output apparatus as a first virtual sound card device and configuring a sound input unit as a second virtual sound card device for the first running instance;
  step 3, running the first running instance and logging in a first account, wherein the first account monitors whether there is an incoming voice data to be processed, and when there is the incoming voice data which is assigned to the first account, the first running instance captures the incoming voice data as a first telephone event;
  step 4, clicking, by the first running instance according to the first telephone event, a page element to answer the first telephone event, and waking up a first voice robot instance on a voice robot client, wherein a sound input apparatus of the voice robot client is the first virtual sound card unit, a sound output apparatus of the voice robot is the second virtual sound card unit;
  step 5, after the first telephone event is connected, outputting, by the first running instance, a first audio of a user dialing in the first telephone event to the first virtual sound card unit, and then inputting the first audio to the voice robot client, so that the first audio is identified and processed by the voice robot server;
  step 6, returning, by the voice robot server, a corresponding second audio for the first audio, and outputting, by the voice robot client, the second audio to the first running instance through the second virtual sound card unit; and step 7, sending, by the first running instance, the second audio to the user dialing in the first telephone event.

8. A non-transitory computer-readable storage medium, having stored thereon instructions which, when executed by a processing circuit, cause the processing circuit to implement the method according to claim 7.

9. An electronic device, comprising the non-transitory computer-readable storage medium according to claim 8, and the processing circuit.

10. A computer system comprising an audio transmission device and one or more processing circuits,
   wherein the audio transmission device comprises a virtual sound card and an audio loopback device, and wherein the virtual sound card is configured to:
   receive a first audio sent by a voice interaction system;
   forward the first audio to a voice platform through the audio loopback device;
   receive a second audio sent by the voice platform; and
   forward the second audio to the voice interaction system through the audio loopback device;
   wherein the one or more processing circuits are configured to:
   load the virtual sound card and the audio loopback device, wherein the virtual sound card comprises at least two virtual sound card devices;
   emulate, through an automation device of a voice interaction system, operations of an operator logging into a voice interaction operation terminal and performing a voice interaction service, initializing one first running instance for automating the voice interaction service on the voice interaction operation terminal, and configuring a sound output apparatus as a first virtual sound card device and configuring a sound input unit as a second virtual sound card device for the first running instance;
   run the first running instance and log in a first account, wherein the first account monitors whether there is an incoming voice data to be processed, and when there is the incoming voice data which is assigned to the first account, the first running instance captures the incoming voice data as a first telephone event;
   click, with the first running instance according to the first telephone event, a page element to answer the first telephone event, and wake up a first voice robot instance on a voice robot client, wherein a sound input apparatus of the voice robot client is the first virtual sound card unit, a sound output apparatus of the voice robot is the second virtual sound card unit;
   after the first telephone event is connected, output, with the first running instance, the first audio of a user dialing in the first telephone event to the first virtual sound card unit, and then input the first audio to the voice robot client, so that the first audio is identified and processed by the voice robot server;
   return, with the voice robot server, a corresponding second audio for the first audio, and output, with the voice robot client, the second audio to the first running instance through the second virtual sound card unit; and
   send, with the first running instance, the second audio to the user dialing in the first telephone event.

11. The computer system according to claim 10, wherein the first audio comprises at least one voice data stream, and the second audio comprises at least one voice data stream, and wherein the first audio is a response to the second audio, or the second audio is a response to the first audio.

12. The computer system according to claim 11, wherein the voice interaction system further comprises:
   a voice interaction server; and
   a voice interaction operation terminal,
   wherein
   the voice interaction server is configured to:
   receive a third audio sent by a user, and send the third audio to the voice interaction operation terminal;
   the voice interaction operation terminal is configured to:
   send the third audio to the audio transmission device;
   receive a fourth audio sent by the audio transmission device; and send the fourth audio to the voice interaction server; and
   the voice interaction server is further configured to:
   send the fourth audio to the user.

13. The computer system according to claim 12, wherein the voice interaction server is further configured to:
   start up the voice interaction operation terminal based on a process operation automation technology, and bind an input apparatus and an output apparatus of the voice interaction operation terminal onto two idle virtual sound card devices in the virtual sound card, respectively; and
   after the voice interaction operation terminal is initialized, simulate, according to a process automation step defined by a template, a real human customer service personnel to log in the voice interaction operation terminal, and use a communication function of the voice interaction system.

14. The computer system according to claim 13, further comprising an interaction integration platform including the audio transmission device, wherein the interaction integration platform further comprises a voice interaction system and a voice platform, and wherein the voice interaction system comprises a voice interaction server and a voice interaction operation terminal, and the voice platform comprises a voice robot server and a voice robot client, wherein
   the voice interaction server is configured to receive a first audio sent by a user terminal, and forward the first audio to the voice interaction operation terminal;
   the voice interaction operation terminal is configured to send a received first audio to the audio transmission device;
   the audio transmission device is configured to send the first audio to the voice robot client;
   the voice robot client is configured to send the first audio to the voice robot server, and receive a second audio sent by the voice robot server, and then send the second audio to the audio transmission device;
   the audio transmission device is further configured to: send the second audio to the voice interaction operation terminal;
   the voice interaction operation terminal is further configured to send a received second audio to the voice interaction server; and
   the voice interaction server is further configured to send the second audio to the user terminal.

15. The computer system according to claim 14, wherein the voice interaction operation terminal comprises a microphone configured to capture sound and convert the captured sound to audio signals.

16. The computer system according to claim 15, further comprising a display screen configured to display the page element.

17. The computer system according to claim 16, further comprising a video camera configured to capture a gesture, wherein the one or more processing circuits are further configured to recognize a sign language from the gesture, and convert the sign language to the first audio.

18. The computer system according to claim 17, wherein the one or more processing circuits are further configured to convert audio signals to the sign language for displaying at the display screen.

19. The computer system according to claim 18, wherein the one or more processing circuits are further configured to emulate the operator based on deep learning.

* * * * *